May 24, 1932. J. L. DRAKE 1,860,140
PROCESS AND APPARATUS FOR PRODUCING SHEET GLASS
Filed Jan. 24, 1928
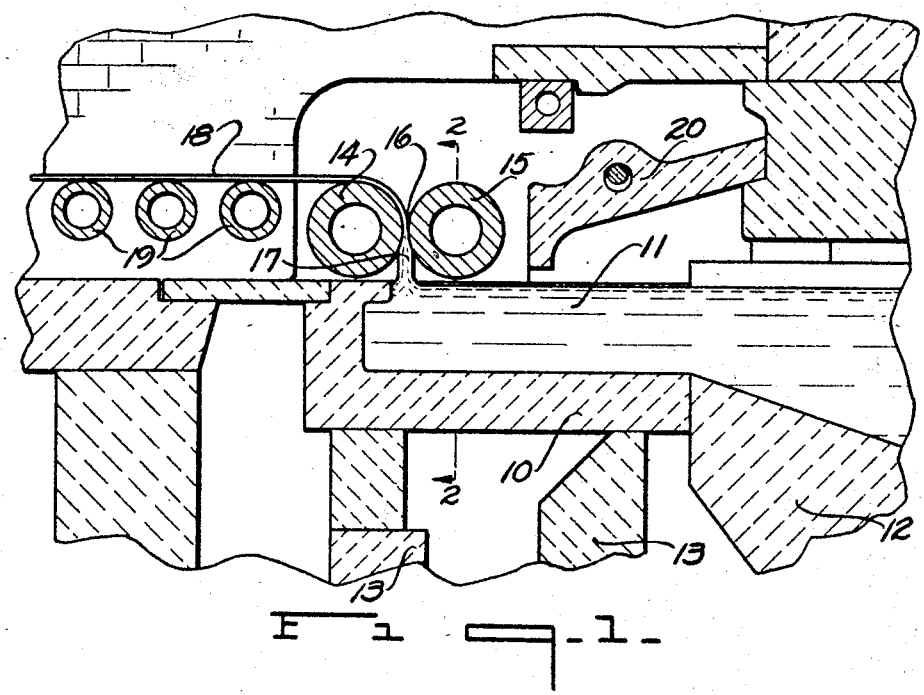
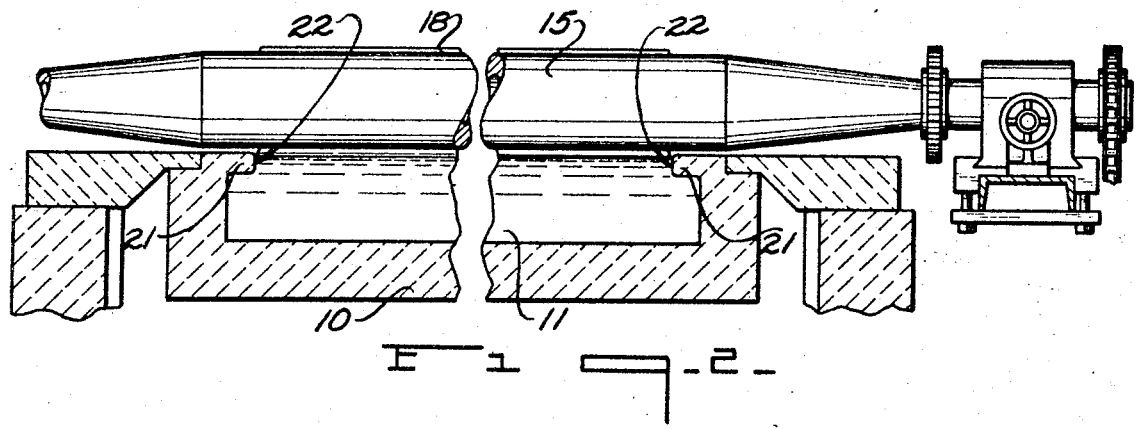
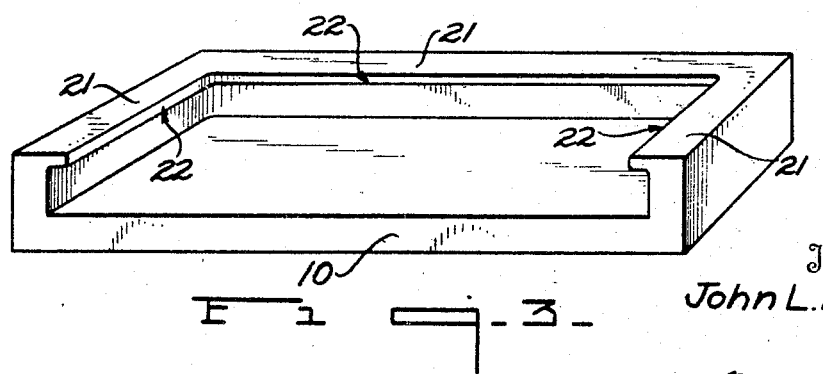
Inventor
John L. Drake
By Frank Fraser
Attorney Patented May 24, 1932

1,860,140

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed January 24, 1928. Serial No. 249,059.

This invention relates to a process and apparatus for producing sheet glass.

An important object of the invention is to provide a process and apparatus for producing sheet glass wherein a mass of molten glass is contained in a suitable receptacle over which are arranged sheet forming means, and means associated with the edges of the receptacle and co-operating with the sheet forming means to assist in producing a sheet of the desired width.

Another object of the invention is to provide an apparatus of this nature wherein the working receptacle, which contains a mass of molten glass, is provided with peripherally arranged means for trapping and retaining heat whereby to more effectively control the temperature of this mass of molten glass at the border portions thereof.

Still another object of this invention is to provide sheet glass apparatus of the herein described nature which includes a receptacle adapted to contain a mass of molten glass, the said receptacle being provided with peripherally arranged laterally extending inwardly directed edge portions which act to constrict or reduce the effective opening through which the sheet may be drawn and to prevent the sheet from being drawn from the molten glass contained in the extreme border portions of the molten mass.

Many other objects, advantages and novel details of construction of the present invention will be made more apparent as this description proceeds, especially when considered in connection with the accompanying drawings wherein:

Figure 1 is a vertical longitudinal sectional view through a sheet glass drawing apparatus constructed in accordance with my invention.

Figure 2 is a vertical sectional view taken substantially on the plane indicated by line 2—2 in Figure 1 and Figure 3 is a perspective view of the working receptacle.

Referring now more particularly to the drawings wherein like reference characters indicate like parts, it will be noted that there is illustrated a working receptacle 10 adapted to contain a mass of molten glass 11 which may be continuously supplied from any desired type of melting furnace 12. As shown the receptacle 10 is preferably supported by means of stools 13 in a suitable heated compartment.

Arranged above the mass of glass 11 is a pair of preferably positively driven rolls 14 and 15 respectively, the rolls being preferably horizontally arranged and spaced to create therebetween a sheet forming pass 16. Upon rotation of the rolls and upon proper handling of the glass, a mass of molten glass 17 is advanced upwardly and through the sheet forming pass 16 where it is reduced or rolled into a sheet 17 of substantially predetermined thickness. As shown the sheet is preferably deflected over roll 14 into a horizontal plane where it is supported and conveyed by means of rolls 19 to an annealing lehr (not shown). A lip tile 20 is shown as arranged above the mass of molten glass 11.

The working receptacle 10 is provided with a peripherally arranged laterally extending inwardly directed flange or lip 21 which may obviously be made separately therefrom and attached thereto or may be integral therewith as illustrated in the drawings. The inner edge 22 of this lip or extension defines the edge of the active or operative opening through which the molten glass may be drawn to form the sheet 18. In other words the mass of molten glass being drawn upwardly by the rolls 14 and 15 is confined in width to the distance between the opposed edges 22 of the lips 21 formed on opposite sides of the working receptacle 10.

In this manner molten glass is not drawn from the extreme border portions of the mass of molten glass but is drawn only from that portion of the molten glass within or removed from the extreme border portions thereof. Furthermore by reason of the inwardly extending lips or extensions 21 heat from the mass of molten glass 11 is arrested or trapped around the periphery of the working receptacle and this trapped heat acts to maintain the glass at the border portion of the mass 11 in a plastic workable condition. Also, any dog metal formed peripherally of the working receptacle 10 is prevented from flowing into the edges of the sheet and any movement of this dog metal is arrested by reason of these inwardly extending projections 21. By reason of the projections 21 the molten glass is not fed to the edges of the sheet in excessive amounts and it is possible therefore to more accurately control the width of the sheet produced and at the same time obtain a smooth edge on the sheet in place of an uneven ragged one. Furthermore it is a known fact that the glass adjacent the sides of the working receptacle is relatively colder than the balance of the molten mass and if large quantities of this cold glass is allowed to move upwardly in the edges of the sheet it is frequently difficult to cause an actual rolling of the sheet and to hold it to the desired thickness. However, with the present construction the glass which is supplied to the edges of the sheet comes from the mass at points remote from the walls of the receptacle so that the above objection is not experienced.

Various modifications of the herein described construction will suggest themselves to those skilled in this art and in consequence of this reservation is made to make such changes, modifications and re-arrangements of the invention as may come within the purview of the accompanying claims.

I claim:

1. In sheet glass apparatus, the combination with a receptacle containing a mass of molten glass, and having inwardly directed peripheral projections at the opposite sides and along the front thereof, of means for drawing glass upwardly from the receptacle and forming it into a sheet, said forming means being so positioned with respect to the receptacle that the glass advanced upwardly from said receptacle will be drawn in contact with the peripheral projections at the sides and front thereof.

2. In sheet glass apparatus, the combination with a receptacle containing a mass of molten glass and having inwardly directed peripheral projections at the opposite sides and also at the front thereof, of a pair of spaced forming rolls mounted above the receptacle for drawing a body of glass upwardly and rolling it to sheet form, said forming rolls being so positioned with respect to the receptacle that the glass advanced upwardly from said receptacle will be drawn in contact with the peripheral projections at the sides and front thereof.

Signed at Toledo, in the county of Lucas and State of Ohio, this 21st day of January 1928.

JOHN L. DRAKE.